(12) United States Patent
Hoang (10) Patent No.: US 12,474,626 B2
(45) Date of Patent: Nov. 18, 2025

(54) MAGNETIC MOUNTING APPARATUS AND METHOD FOR INSTALLING CAMERAS

(71) Applicant: i3 International Inc., Toronto (CA)

(72) Inventor: Jack Hoang, Toronto (CA)

(73) Assignee: i3 International Inc., Toronto (CA)

( * ) Notice: Subject to any disclaimer, the term of this patent is extended or adjusted under 35 U.S.C. 154(b) by 177 days.

(21) Appl. No.: 18/222,160

(22) Filed: Jul. 14, 2023

(65) Prior Publication Data
US 2024/0019771 A1  Jan. 18, 2024

(30) Foreign Application Priority Data
Jul. 15, 2022 (CA) .................................. CA 3168053

(51) Int. Cl.
*G03B 17/56* (2021.01)
*H04N 23/51* (2023.01)

(52) U.S. Cl.
CPC ........... *G03B 17/561* (2013.01); *H04N 23/51* (2023.01)

(58) Field of Classification Search
CPC ....... G03B 17/561; H04N 23/51; H04N 23/57
See application file for complete search history.

(56) References Cited

U.S. PATENT DOCUMENTS

| | | | |
|---|---|---|---|
| 9,992,389 B1 * | 6/2018 | Fu | F21V 33/0056 |
| 10,996,547 B2 * | 5/2021 | Ramones | G03B 17/561 |
| 2018/0013271 A1 * | 1/2018 | Goulden | H02G 3/04 |
| 2018/0340646 A1 * | 11/2018 | Mehdi | F16M 11/2035 |
| 2019/0215423 A1 * | 7/2019 | Ortiz | H04N 23/51 |
| 2021/0160406 A1 * | 5/2021 | Green | G01D 11/30 |
| 2022/0217273 A1 * | 7/2022 | Vinahradau | G08B 13/19632 |
| 2023/0367181 A1 * | 11/2023 | Shin | H04N 23/54 |
| 2024/0140313 A1 * | 5/2024 | Bellamy | H04N 23/698 |

* cited by examiner

*Primary Examiner* — Amy R Hsu
(74) *Attorney, Agent, or Firm* — Kagan Binder, PLLC (57) ABSTRACT

Provided is a magnetic backplate for mounting a camera to a surface having at least some metal thereon. The backplate includes an embedded magnet for attaching the backplate to a metal surface on one side, and a camera is attached to the opposing side of the backplate. The magnetic means of attachment allows for easy installation, relocation and removal of cameras from ceilings having T-bar frames. The magnetic backplate further includes a plurality of holes for attaching the backplate to electrical junction boxes, whereby the backplate forms a mount for a camera and a cover for the junction box.

19 Claims, 8 Drawing Sheets

MAGNETIC MOUNTING APPARATUS AND METHOD FOR INSTALLING CAMERAS

PRIORITY CLAIM

This application claims priority to Canadian application having Serial Number 3,168,053, filed on Jul. 15, 2022, which is incorporated herein by reference in its entirety.

FIELD OF THE INVENTION

The embodiments disclosed herein relate to a surveillance camera mounts, and particularly to a magnetic mounting apparatus for mounting cameras.

BACKGROUND OF THE INVENTION

In the field of security and surveillance, it may be advantageous to have cameras strategically located throughout a building or other public space. However, as a matter of interior installation, attaching cameras in convenient locations (such as on ceilings or over electrical outlets) may be difficult and may compromise the structural integrity of common building materials.

Many ordinary means of attachment, such as nails and screws, may permanently mark or otherwise damage components of an attachment surface, while many commercial adhesives may not be sufficiently strong to bear the weight of a security camera or the like—those commercial adhesives that may do so may be difficult to work with and/or hazardous to the health of workers. Similarly, many commercial ceilings having a T-bar suspending ceiling grid panels are inadequate to bear the weight of security cameras on their panels.

A further problem is the time taken to identify an appropriate camera location, install a camera mount, mount the camera and observe the picture/video captured by the camera. If the camera viewing angle is not ideal, it requires additional time to remove the camera, detach the mount and relocate the mount and camera to another location.

Accordingly, there is a need for a camera mounting apparatus that may be quickly and easily installed, and moved if required, to adjust the camera viewing angle.

SUMMARY OF THE INVENTION

The invention provides a magnetic backplate for mounting a camera. The backplate includes a body and a magnet. The body has substantially flat front and back surfaces. The magnet is attached to the back surface of the body for attaching the backplate to a metal surface. The magnet has substantially flat front and back surfaces. The body has a cable opening for a cable to pass through the body to the camera. The body also has holes for receiving fasteners to attach the camera to the backplate.

The body preferably includes a recess in the substantially flat back surface configured to accommodate the magnet so that when the magnet is in the recess with the back surface of the magnet attached to the body, the front surface of the magnet is flush with the non-recessed portion of the back surface of the body.

The magnet is preferably a neodymium magnet having a magnetic pull force of at least 15 kg.

The metal surface may be a T-bar suspended ceiling frame.

The body may also include openings for receiving fasteners to attach the backplate to ceiling panels.

The body may be shaped to cover an electrical junction box. The body may have openings for receiving fasteners to attach the backplate to the electrical junction box.

The camera may be a dome camera.

The body may be a disc.

The body may be made of metal and the magnet may be attached to the body by magnetic force.

The magnet may be attached to the body by adhesive.

The backplate may include multiple magnets attached to the back surface of the body.

The backplate of claim 1, may further include clips attached to the back surface of the body configured to secure the backplate to the metal surface.

The invention also provides a method for installation of a camera having a cable using the backplate by first passing the cable of the camera through the cable opening in the body. Then attaching the camera to the front surface of the body using one or more fasteners and attaching the back surface of the magnet to the metal surface so that the magnet attaches the backplate to the metal surface by magnetic force.

The method may further include sliding the magnetic backplate and the attached camera along the metal surface to another position.

BRIEF DESCRIPTION OF THE DRAWINGS

The drawings included herewith are for illustrating various examples of devices and methods of the present specification.

DETAILED DESCRIPTION

Various apparatuses or processes will be described below to provide examples of embodiments of the invention. No embodiment described herein limits any claimed embodiment and any claimed embodiment may cover processes or apparatuses that differ from those described below. The claimed embodiments are not limited to apparatuses or processes having all of the features of any one apparatus or process described herein or to features common to multiple or all of the apparatuses described below.

There is a need for a magnetic mounting apparatus as a means of attaching security cameras and other building accessories and/or fixtures quickly, easily, and safely, particularly a magnetic mounting apparatus that attaches to the metal frame of a T-bar suspended ceiling or an electrical junction box.

Figure 1:
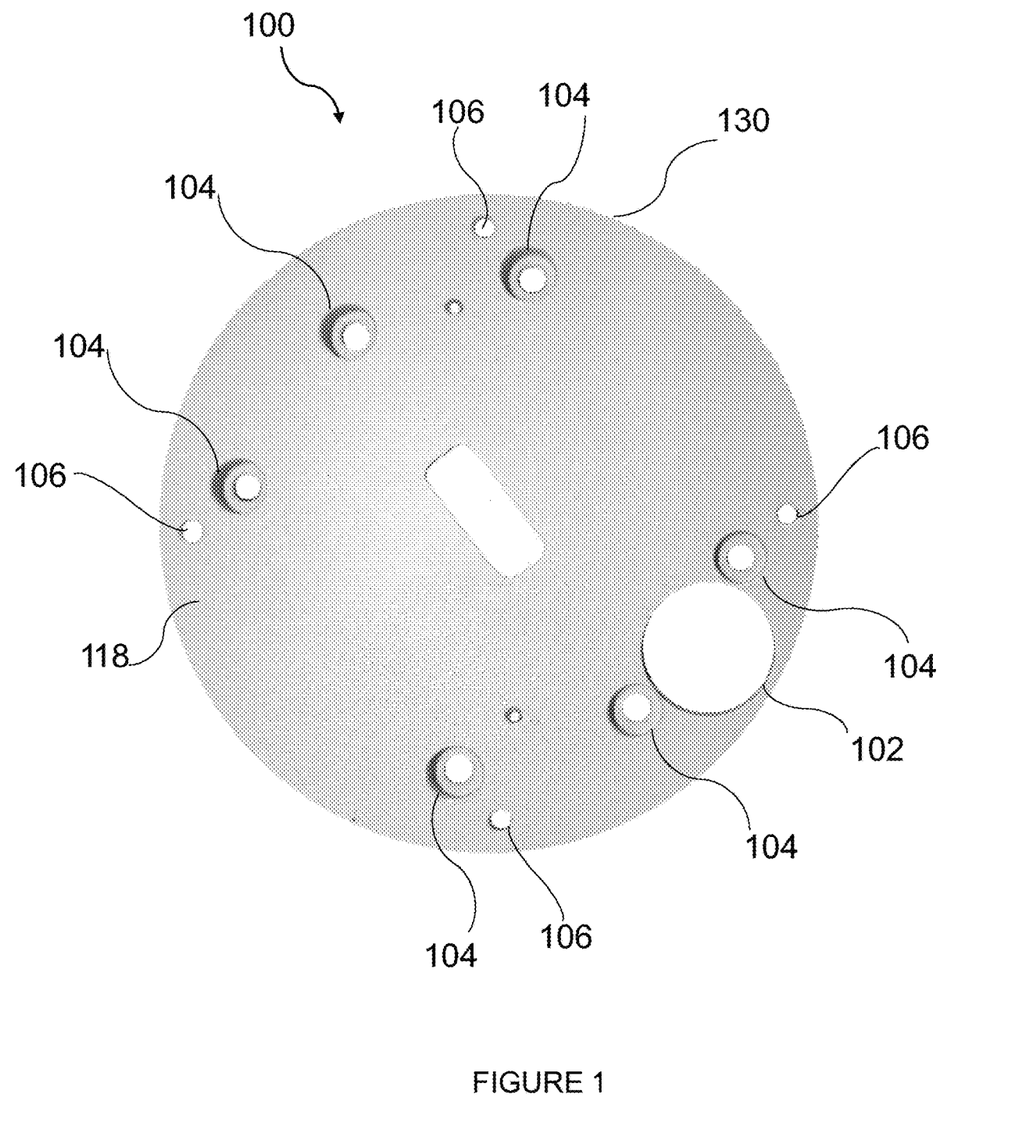
FIG. 1 is a front view of a magnetic backplate, according to an embodiment.
Figure 3:
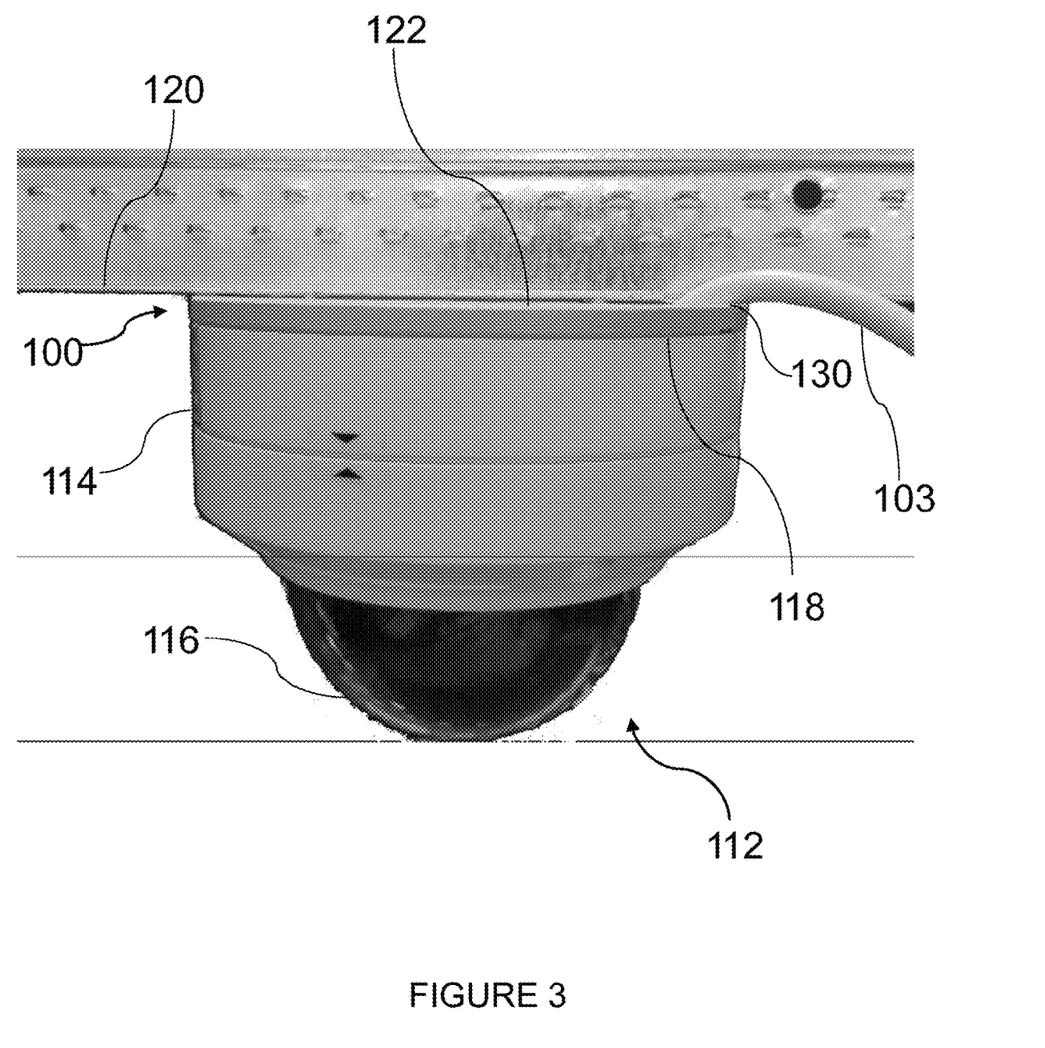
FIG. 3 is a side view of the magnetic backplate of FIG. 1, shown attached to a camera and a metal surface.

Referring now to FIG. 1, shown therein is a front view of a magnetic mounting backplate 100 for attachment to a metal surface. The metal surface is preferably a metal frame (T-bar frame 120 as shown in FIG. 3) for a suspended ceiling. Alternatively, the metal surface may be a surface of a metal electrical junction box.

The magnetic backplate 100 includes a body 130 in which further features may be embedded or integrated as described below. The body 130 may be circular in shape so that it can be aligned with a "dome" camera 112 (as shown in FIG. 3) with a circular base. It will be apparent to a person of skill in the art that other shapes for the body 130 are possible. The body 130 is preferably constructed of metal, such as aluminum, or stainless steel or a metal alloy, and may be cast in a mold. In some embodiments the body 130 may comprise plastic or PVC for example.

The magnetic backplate 100 has a flat front surface 118. In preferred embodiments, a camera's base substantially covers the front surface 118 when the camera is attached to the magnetic backplate 100 (see FIG. 3).

The magnetic backplate 100 may include a cutout 102 in the body 130 for cables (not shown) to pass from the camera through the magnetic backplate 100 and into the ceiling or other surface to which the magnetic backplate 100 is attached. The cutout 102 is preferentially circular in shape but may be shaped differently according to different embodiments.

The magnetic backplate 100 may include countersink openings 104 for fastening the magnetic backplate 100 to a surface (e.g., a ceiling tile, junction box, etc.), as a means of attachment, by driving fasteners (e.g., screws) through the openings 104 and into the surface.

Figure 2:
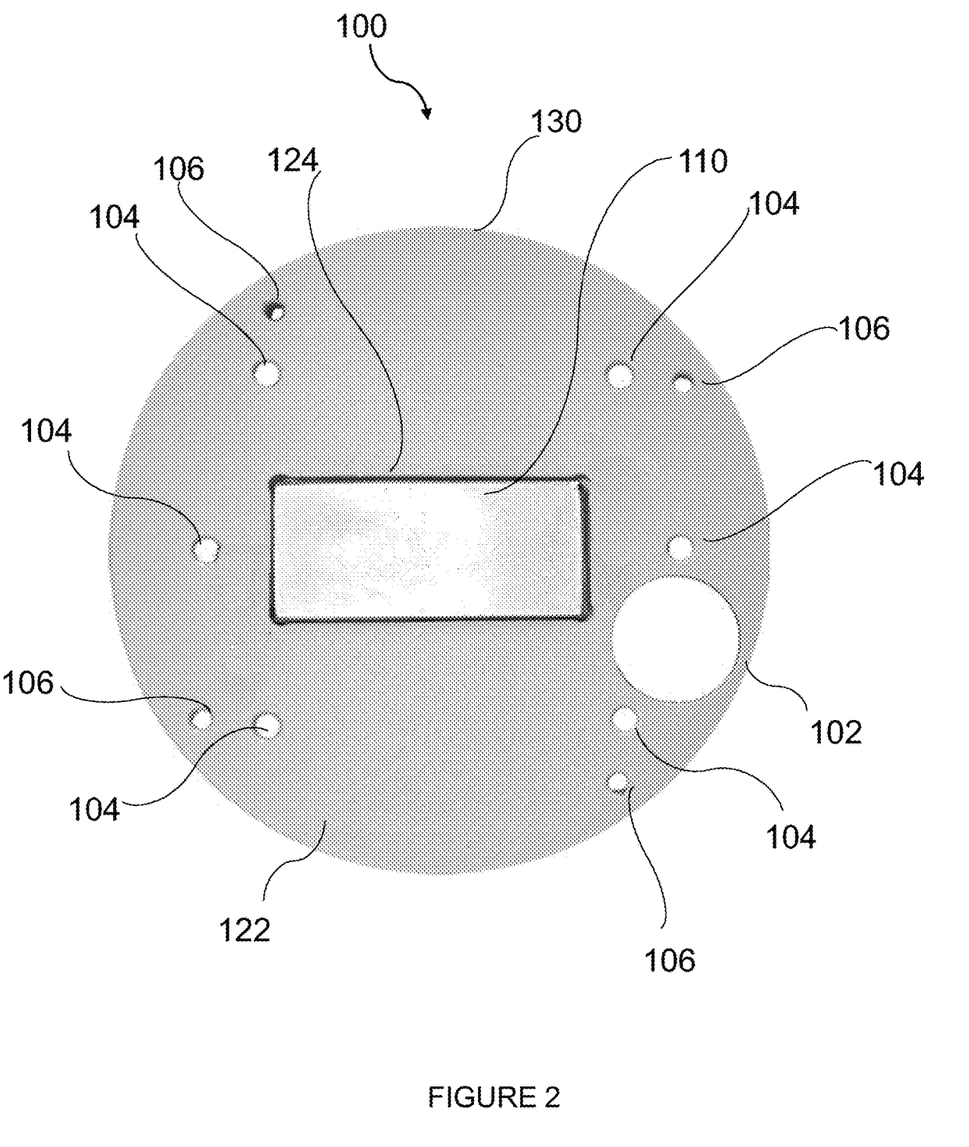
FIG. 2 is a back view of the magnetic backplate of FIG. 1.

Referring now to FIG. 2, shown therein is a back view of the magnetic backplate 100 shown in FIG. 1.

The magnetic backplate 100 further includes openings 106 for receiving fasteners (e.g., screws) to attach the backplate 100 to a camera. The fasteners pass through the back surface 122 of the body 130 and into the camera housing.

The magnetic backplate 100 further includes a magnet 110 for mounting the backplate 100 to a metal surface. The body 130 may include a recess 124 in the back surface 122 for receiving the magnet 110, such that the magnet 110 is substantially embedded within the body 130. When inserted into the recess 124, an exposed surface of the magnet 110 is preferably substantially flush with the back surface 122 of the backplate 100. The magnet 110 may be rectangular in cross-section as shown in the drawings, and the depth of the recess may then be equal to the thickness of the magnet 110 to ensure that the outer surface of the magnet 110 is flush with the flat back surface of the body 130 when the magnet 110 is disposed in the recess.

The magnet 110 may be attached to the body 130, for example, by adhesive. In embodiments wherein the body 130 is constructed of metal, the magnet 110 may be attached to the body 130 by magnetic force alone.

The front surface 118 and back surface 122 of the body 130 are substantially flat as shown in the drawings, meaning that the portions of the surfaces other than where there are holes or recesses in the surface are flat. The front surface is parallel to the back surface so that the body may be in the form of a disc. Alternatively the body may be shaped to match the shape of the metal surface to which is it designed to attach, which may be oval, square, rectangular, hexagonal, etc.

The magnet has a magnetic pull force at least as great as the weight of the camera and preferably at least 30% greater than the weight of the camera. The magnet 110 may be a rare-earth magnet, preferably a neodymium magnet, having a magnetic pull force of at least 15 kg. Neodymium magnets are preferred since approximately 1% of the magnetic force of the magnet is lost every 10 years allowing for long use and continued attachment of the magnet to a metal surface without losing contact. Other types of magnets may alternatively be used.

The magnet is selected so that the force needed to slide the backplate and attached camera horizontally (referred to herein as the shear force) is sufficiently low that a person can slide the backplate along the metal surface. Preferably the shear force is less than 5 kg and more preferably less than 2 kg, but may be up to 10 kg, 15 kg, 20 kg, or 25 kg. The shear force is mainly frictional and depends on the nature of the surfaces of the metal surface, the back surface of the body (in preferred embodiments where the front surface of the magnet is flush with the non-recessed portion of the back surface of the body), and the front surface of the magnet. For a particular metal surface, the shear force can be varied based on the properties of the selected magnet's front surface and the body's back surface.

Figure 4:
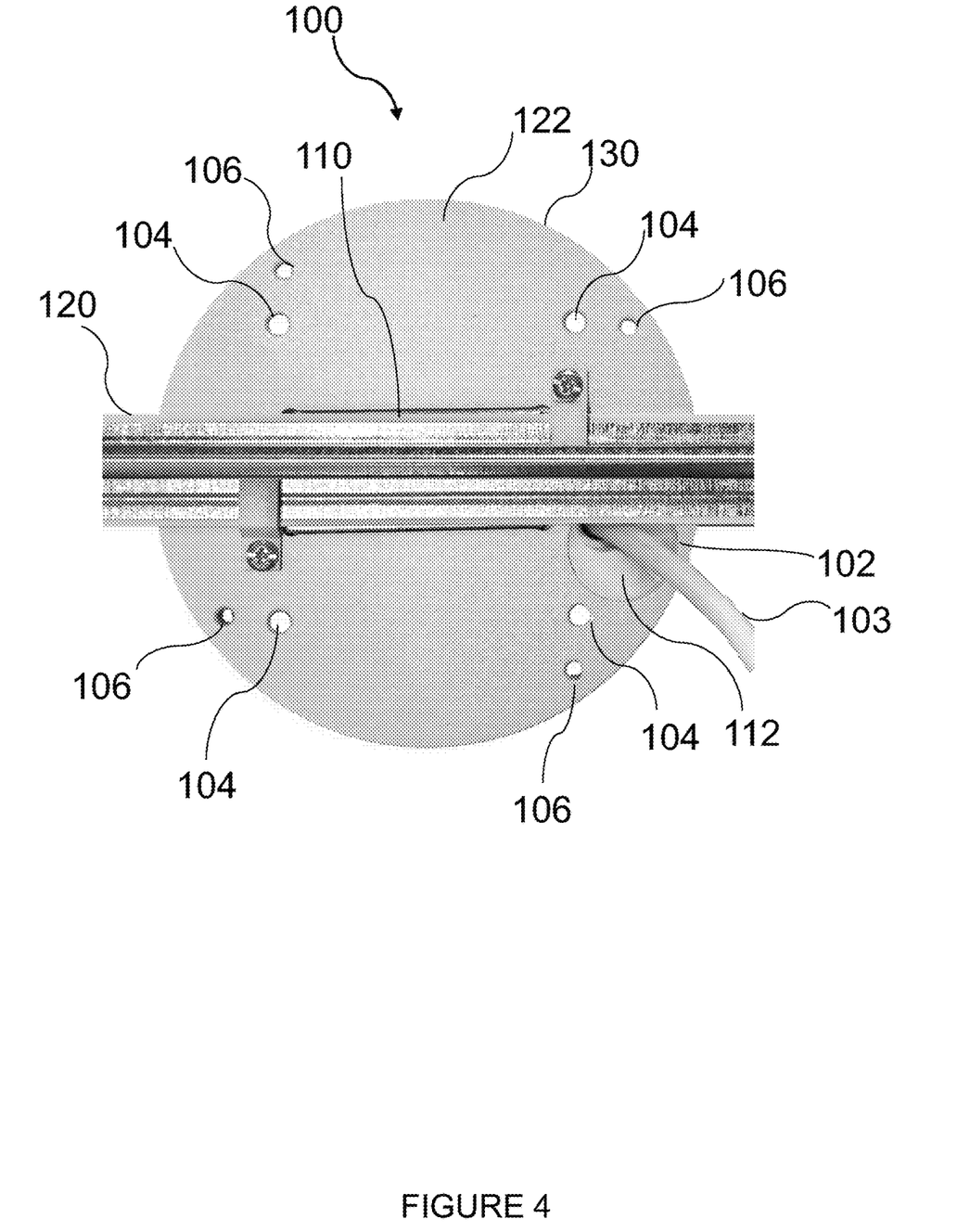
FIG. 4 is a back view of the magnetic backplate of FIG. 5, shown attached to a metal surface.

Referring to FIGS. 3-4, shown therein is a side view and back view, respectively of the magnetic backplate 100 mounted to a metal surface 120 and attached to a camera 112. The metal surface 120 is preferably in a horizontal plane (as shown in FIG. 3), for example, a T-Bar frame of a suspended ceiling. According to other embodiments, the magnetic backplate 100 may be attached to angled or vertical metal surfaces, aided by passing fasteners through openings 104 into the surface, in addition to magnetic attachment of the magnet 110 to the metal surface.

The magnetic backplate 100 and the camera 112 attached thereto may be slid along the metal surface 120 to another position to change the camera view. The magnet 110 is selected so that the magnetic attraction of the magnetic backplate 110 to the metal surface 120 is sufficient to hold the camera 112 and backplate 110 to the metal surface 120, while allowing the backplate 100 (and camera attached thereto) to be moved along the metal surface 120 relatively easily. This may be particularly advantageous when attempting to find a good viewing angle when installing the camera 112 for the first time. It is also advantageous to quickly and easily remove the mounted camera to perform repairs or maintenance on the camera 112, the metal surface 120 or another adjacent structure (e.g., ceiling tiles).

The cutout 102 is positioned relative to the magnet 110 such that a cable 103 from the camera 112 may pass through the body 130 of the magnetic backplate 100 without being impeded by the metal surface 120, as shown in FIG. 3, when the magnet 110 contacts the metal surface 120. Similarly, the cable 103 may be connected to a display device to observe the camera view while the camera 112 and magnetic backplate 100 are moved along the metal surface 120.

According to some embodiments (not shown), the metal surface 120 may be a metal electrical junction box, such as standardized North American electrical junction boxes. The magnetic backplate 100 and body 130 may be sized and shaped to mount to a ceiling or wall-mounted electrical junction box. In this manner, the backplate 100 simultaneously acts as a mount for the camera 112 and a cover for the junction box, in a manner similar to a light fixture.

Referring now to FIG. 3, the camera 112 includes a housing 114 with a base for attachment to the magnetic backplate 100. The camera 112 includes a cable 103 for supplying power to the camera 112 and/or for transmitting video, audio, or other data from the camera 112. According to other embodiments, the camera 112 may be wireless and include components to transmit video, audio and other data wirelessly. The camera 112 further includes a lens 116, such as a fish-eye lens. The lens may be surrounded by a shroud (as shown). When attached to the magnetic backplate 100, the camera 112 covers substantially all of the front surface 118 of the magnetic backplate 110. When attached to the metal surface 120, the back surface 122 of the magnetic mount 110 contacts the metal surface 120.

Referring now to FIG. 4, shown therein is a back view of the magnetic backplate 100 shown attached to the metal surface 120 (i.e., a T-bar frame for a suspended ceiling). The magnet 110 may have dimensions to match the dimensions of the metal surface 120. For example, the width of the magnet 110 may be substantially the same as the width of the metal surface 120. Guide pins may be used to align the magnet 110 with the metal surface 120 to ensure the metal surface 120 contacts as much surface area of the magnet 110 as possible to ensure a maximum attractive force between the magnet 110 and the metal surface 120.

The magnet 110 may be positioned longitudinally with respect to the metal surface 120 to which it is attached (as shown). According to other embodiments, the magnet 110 may be positioned transversely with respect to the metal surface 120. The orientation of the magnet 110 with respect to the metal surface 120 may be dependent on the thickness or length of the metal surface 120.

The magnetic attraction between the magnet 110 and the metal surface 120 is sufficient to hold the magnetic backplate 100, and the camera 112 attached thereto, to the metal surface 120 without further aid.

Figure 5:
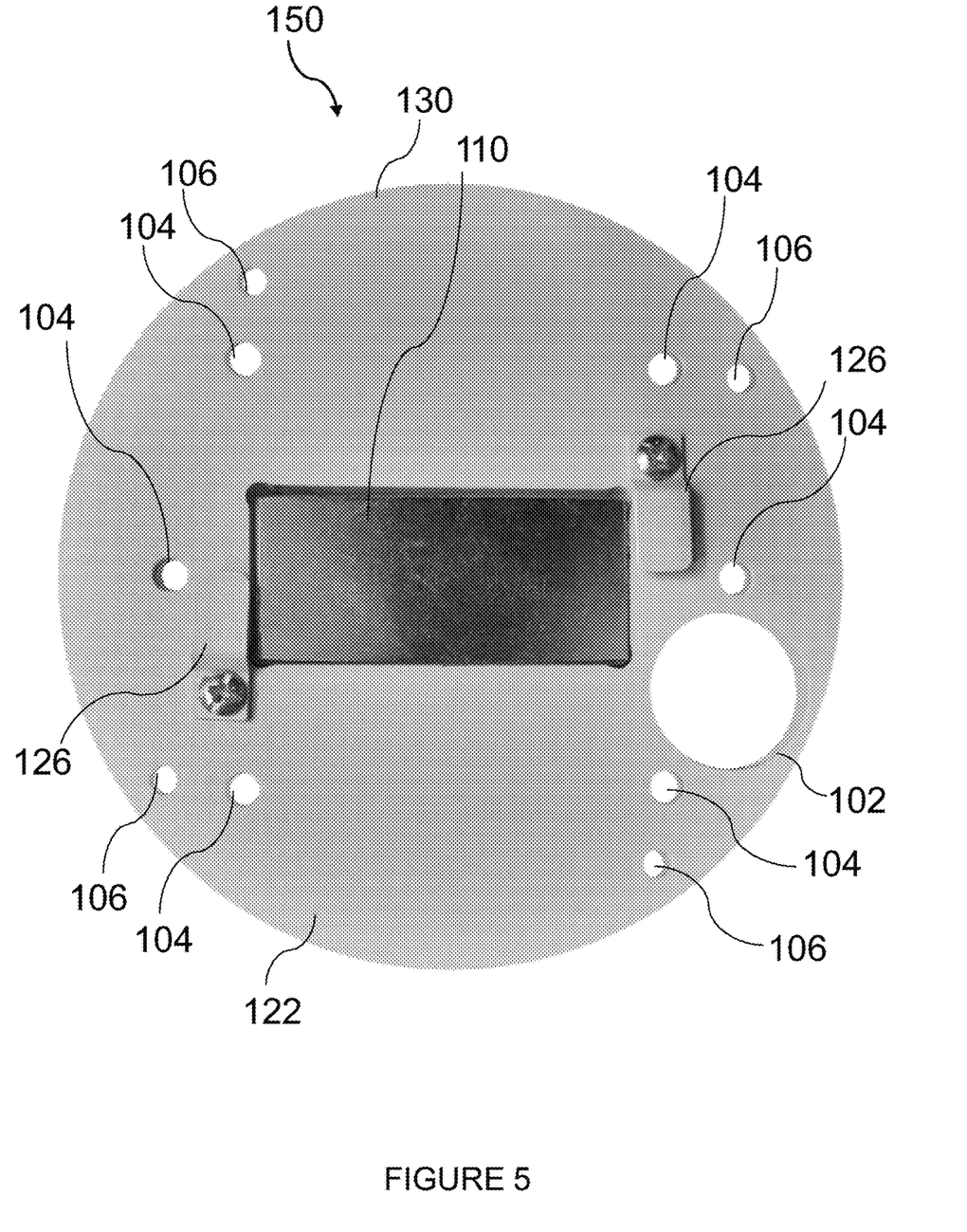
FIG. 5 is a back view of a magnetic backplate, according to another embodiment.

Referring to FIG. 5, shown therein is a back view of a magnetic mounting backplate 150, according to another embodiment. The magnetic backplate 150 is substantially similar to the magnetic backplate 100 in FIGS. 1-4 and includes a body 130, openings 104, openings 106, a magnet 110, and a back surface 122.

The magnetic backplate 150 further includes clips 126 on the back surface 122 of the body 130. The clips 126 are preferably positioned adjacent to the magnet 110. The clips 126 may be attached to body 130 by, for example, fasteners (e.g., screws).

Figure 6:
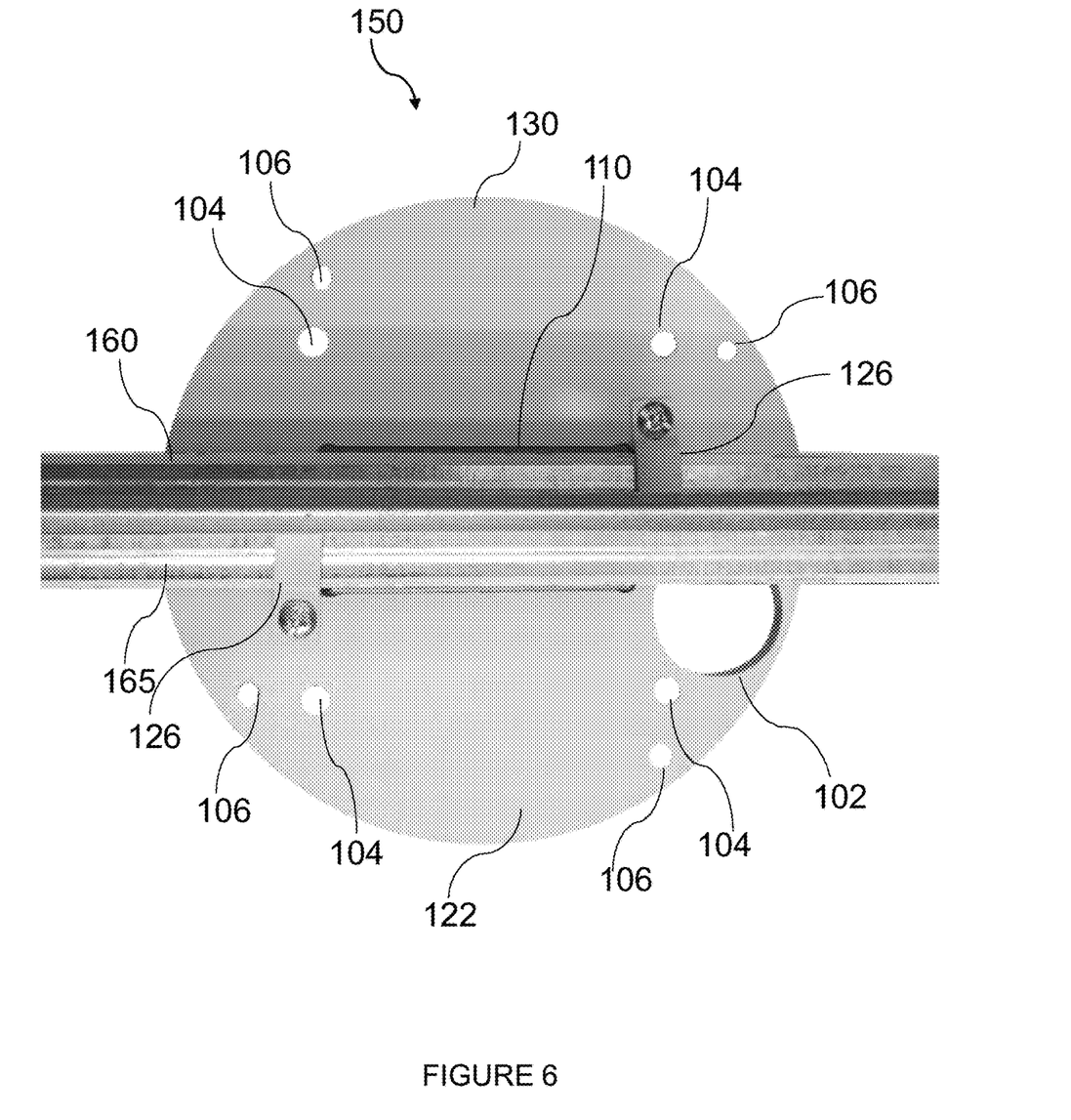
FIG. 6 is a back view of the magnetic backplate of FIG. 5, shown attached to a metal surface.
Figure 7:
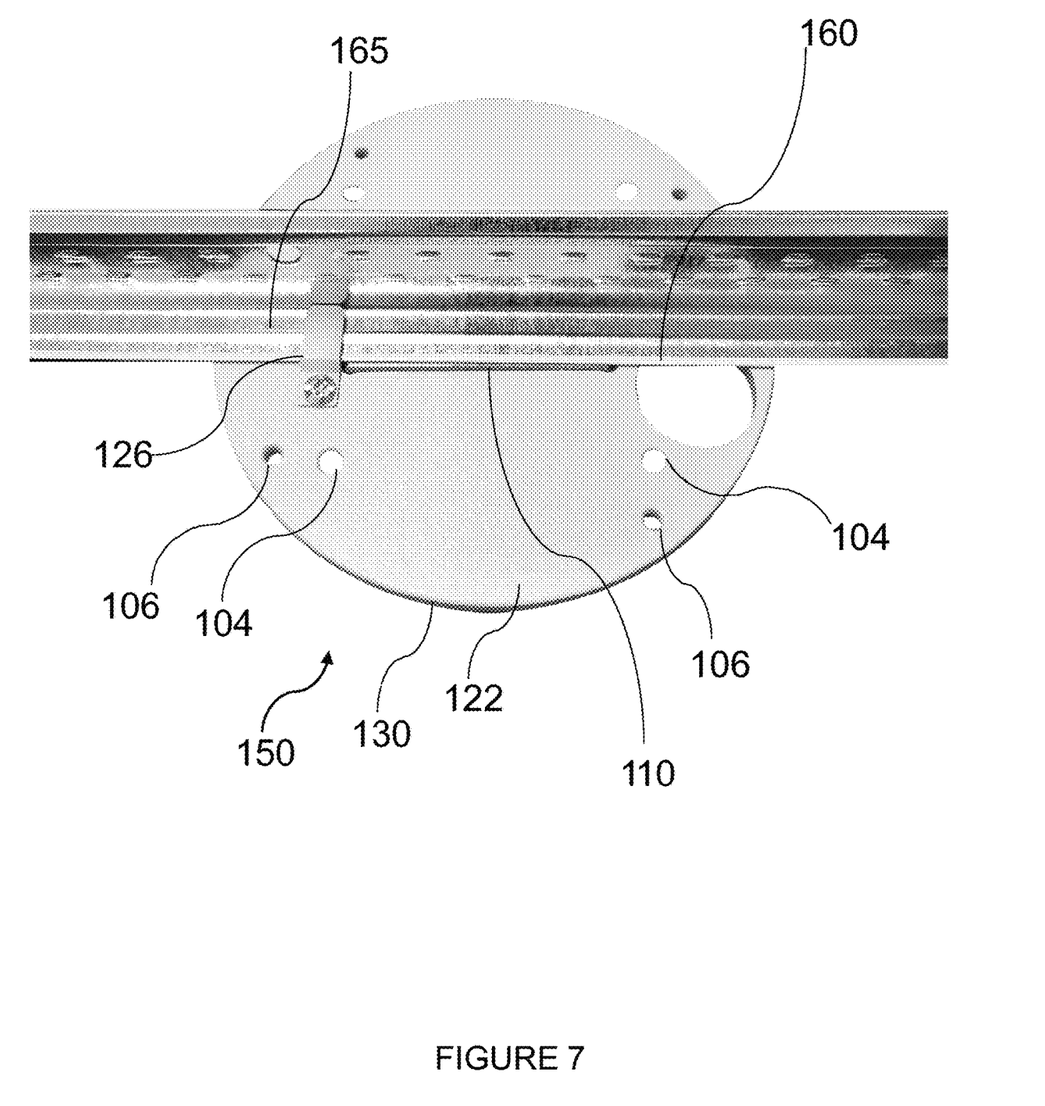
FIG. 7 is a perspective view of the magnetic backplate of FIG. 5, shown attached to a metal surface.

Referring to FIGS. 6 and 7, shown therein are back and perspective views, respectively, of the magnetic backplate 150 attached to a T-bar suspended ceiling metal frame 160. The metal frame 160 includes a lip 165. The clips 126 contact the lip 165 such that the T-bar portion of the metal frame 160 is held between the clips 126 and back surface 122 of the body 130 to further secure the magnetic backplate 150 to the metal frame 160, in addition to the magnetic attraction between the magnet 110 and the metal frame 160.

Figure 8:
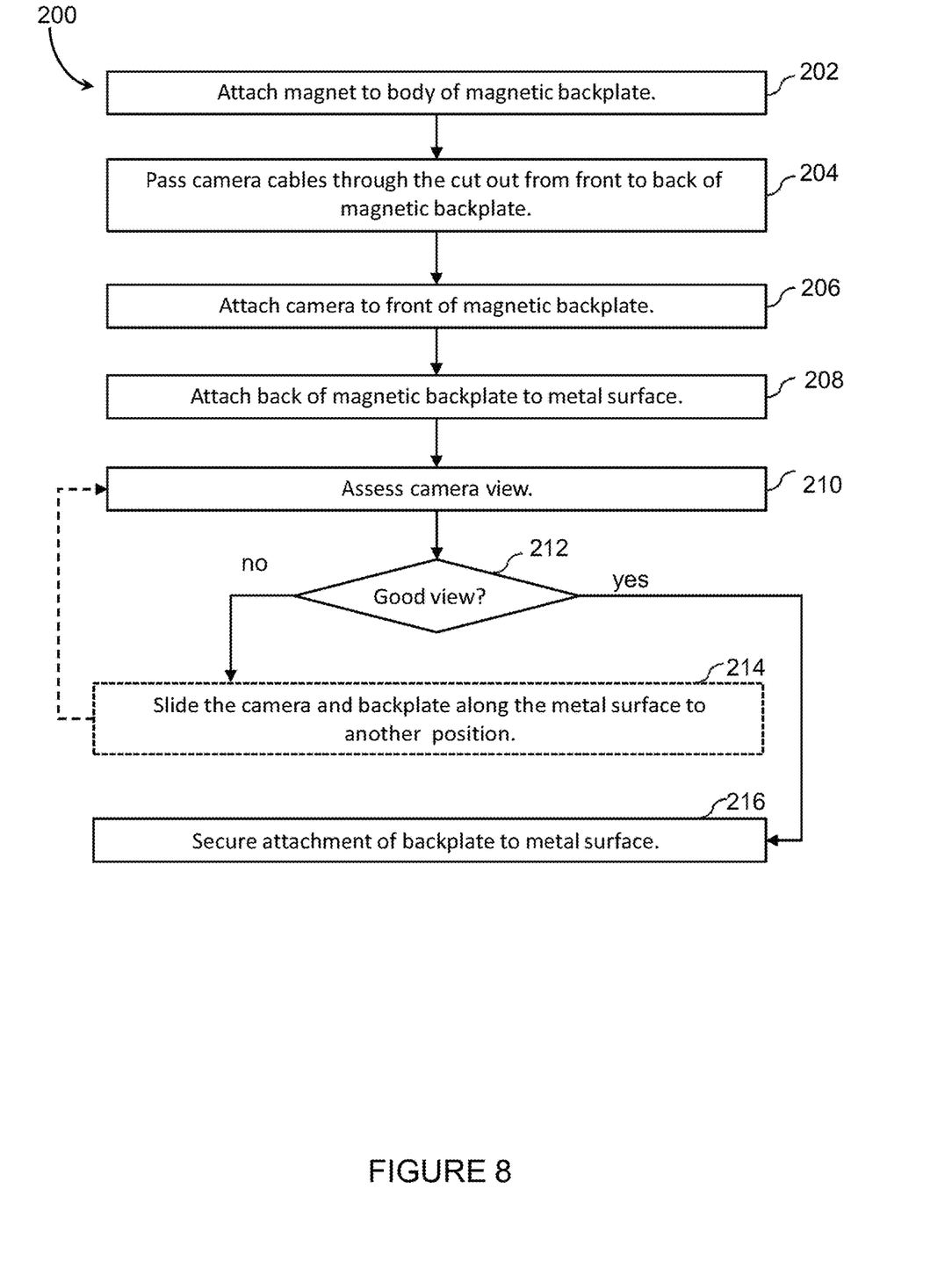
FIG. 8 is a flow diagram of a method for mounting the magnetic backplate to a camera and a metal surface.

Referring to FIG. 8, shown therein is a flow diagram of a method 200 for mounting a camera to a metal surface using the magnetic backplates shown in FIGS. 1-7. For reference, in the description of method 200 the elements from FIGS. 1-7 are indicated in parenthesis.

At step 202 of method 200, the magnet 110 is affixed to the body 130 of the magnetic backplate 100 or magnetic backplate 150 using, for example, adhesive and/or the magnetic attraction of the magnet 110 to the metal body 130. According to some embodiments, the magnetic backplate 100, 150 may be provided with the magnet 110 already attached.

At step 204 of method 200, any cable(s) 103 from a camera 112 to be mounted are passed through the cutout 102 in the body 130 from the front 118 to back 122 of the magnetic backplate 100, 150.

At step 206 of method 200, the camera 112 is attached to front 118 of the magnetic backplate 100, 150. The camera 112 may be attached using one or more fasteners (e.g., screws) that are received into corresponding openings 106 in the magnetic backplate 100, 150.

At step 208 of method 200, the back 122 of the magnetic backplate 100, 150 is mounted to a metal surface 120, 160. The metal surface 120, 160 may be a T-bar ceiling frame for a suspended ceiling. The metal may be an electrical junction box cover. The magnet 110 in the magnetic backplate 100, 150 is made to contact the metal surface 120, 160 to attach the backplate (and the camera 112) to the metal surface 120, 160.

At step 210 of method 200, the camera 112 view may be assessed at the current position the camera 112 and magnetic backplate 100, 150 are mounted. The camera 112 view may be assessed by connecting any cables 103 (at least temporarily) to a monitor, laptop or other display device to assess the view.

At step 212 of method 200, if the view from the camera 112 is good, the method 200 proceeds to step 216. If the view is not good, the method 200 proceeds to step 214.

At step 214 of method 200, the magnetic backplate 100, 150 and the camera 112 attached thereto may be slid along the metal surface 120, 160 to another position. The camera 112 and backplate 100, 150 may be moved while the cable 103 remains connected to the display device to observe the camera view. Act 210, 212 and 214 may be repeated until a good camera 112 view is achieved.

At step 216 of method 200, the attachment of the magnetic backplate 100, 150 (and the camera 112) to the metal surface 120, 160 is secured. The backplate 100, 150 may be secured by passing fasteners through the backplate into the metal surface 120, 160 or an adjacent surface (e.g., suspended ceiling tiles) to the metal surface 120, 160. The backplate 100, 150 may be secured by use of clips 126 to hold onto the metal surface 160. After step 216, the camera 112 and backplate 110, 150 are effectively fixed in position.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

Unless expressly stated or otherwise clearly implied herein, the conjunction "or" as used in the specification and claims shall be interpreted as a non-exclusive "or" so that "X or Y" is true when X is true, when Y is true, and when both X and Y are true, and "X or Y" is false only when both X and Y are false.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

It will be appreciated by a skilled person that, where a device is described with multiple components having different and distinct functions and functionalities, such a device further includes any different assignment of functions and functionalities between and among the components that produces a like result. It will be further appreciated that a single component, whether or not explicitly named, recited, or described, may have the functionality ascribed to different components in addition to or in lieu of the operation of those components. It will be further appreciated that the functionality of a single component may be performed by multiple other components, whether or not explicitly named, recited, or described, in addition to or in lieu of the operation of the single component.

It will be appreciated by a skilled person that, where a series of actions, options, steps, or states are described in the context of a method, such a method further includes any different order or permutation of the actions, options, steps, or states that produces a like result. It will be further appreciated that different actions, options, steps, or states of such a method may be performed simultaneously, sequentially, or otherwise.

The terms "about" and "approximately" can be used to include any numerical value that can vary without changing the basic function of that value. It is used to indicate that a specified value should not be construed as a precise or exact value, and that some variation either side of that value is contemplated and within the intended ambit of the disclosure. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Numerical values in the specification and claims of this application should be understood to include numerical values which are the same when reduced to the same number of significant figures and numerical values which differ from the stated value by less than the experimental error of conventional measurement technique of the type described in the present application to determine the value.

The scope of the claims that follow is not limited by the embodiments set forth in the description. The claims should be given the broadest purposive construction consistent with the description and figures as a whole.

What is claimed is:

1. A magnetic backplate for mounting a camera, the backplate comprising:
   a body having substantially flat front and back surfaces; and
   a magnet attached to the back surface of the body for attaching the backplate to a metal surface above the camera and backplate, the magnet having substantially flat front and back surfaces,
   wherein the body comprises a cable opening for a cable to pass through the body to the camera, and
   wherein the body comprises a plurality of holes for receiving fasteners to attach the camera to the backplate, the camera being below the backplate, and
   wherein the magnet has a magnetic pull force greater than the sum of the weights of the camera and the backplate so that the camera and the backplate are held in magnetic connection with the metal surface above the camera and backplate.

2. The backplate of claim 1, wherein the body comprises a recess in the back surface of the body configured to accommodate the magnet so that when the magnet is in the recess with the back surface of the magnet attached to the body, the front surface of the magnet is flush with the non-recessed portion of the back surface of the body.

3. The backplate of claim 1, wherein the magnet has a magnetic pull force greater than 1.3 times the sum of the weights of the camera and the backplate.

4. The backplate of claim 1, wherein the magnet is a neodymium magnet having a magnetic pull force of at least 15 kg.

5. The backplate of claim 1, wherein the backplate is configured so that when the backplate is magnetically attached to the metal surface, the shear force of the backplate relative to the metal surface is less than 5 kg.

6. The backplate of claim 1, wherein the metal surface is a T-bar suspended ceiling frame.

7. The backplate of claim 6, wherein the body further comprises a plurality of openings for receiving fasteners to attach the backplate to ceiling panels.

8. The backplate of claim 1, wherein the body is shaped to cover a particular electrical junction box.

9. The backplate of claim 8, wherein the body further comprises a plurality of openings for receiving fasteners to attach the backplate to the electrical junction box.

10. The backplate of claim 1, wherein the camera is a dome camera.

11. The backplate of claim 1, wherein the body is a disc having a diameter approximately equal to the diameter of a circular surface of the camera.

12. The backplate of claim 1, wherein the body comprises metal and the magnet is attached to the body by magnetic force.

13. The backplate of claim 1, wherein the magnet is attached to the body by adhesive.

14. The backplate of claim 1, wherein the backplate comprises a plurality of magnets attached to the back surface of the body.

15. The backplate of claim 1, further comprising clips attached to the back surface of the body configured to secure the backplate to the metal surface.

16. A method for installation of a camera comprising a cable using the backplate of claim 1, the method comprising the steps of:
   passing the cable of the camera through the cable opening in the body;
   attaching the camera to the front surface of the body using one or more fasteners; and
   attaching the front surface of the magnet to the metal surface, wherein the magnet attaches the backplate to the metal surface by magnetic force.

17. The method of claim 16, further comprising sliding the magnetic backplate and the attached camera along the metal surface to another position.

18. A magnetic backplate for mounting a camera, the backplate comprising:
   a body having substantially flat front and back surfaces; and
   a magnet attached to the back surface of the body for attaching the backplate to a metal surface above the camera and backplate, the magnet having substantially flat front and back surfaces, wherein the body comprises a plurality of holes for receiving fasteners to attach the camera to the backplate, the camera being below the backplate, and wherein the magnet has a magnetic pull force greater than the sum of the weights of the camera and the backplate so that the camera and backplate are held in magnetic connection with the metal surface above the camera and backplate.

19. The backplate of claim 18, wherein the body comprises a recess in the substantially flat back surface configured to accommodate the magnet so that when the magnet is in the recess with the back surface of the magnet attached to the body, the front surface of the magnet is flush with the non-recessed portion of the back surface of the body.

* * * * *